No. 706,209. Patented Aug. 5, 1902.
W. J. SUMNER.
CASTER.
(Application filed May 20, 1902.)
(No Model.)
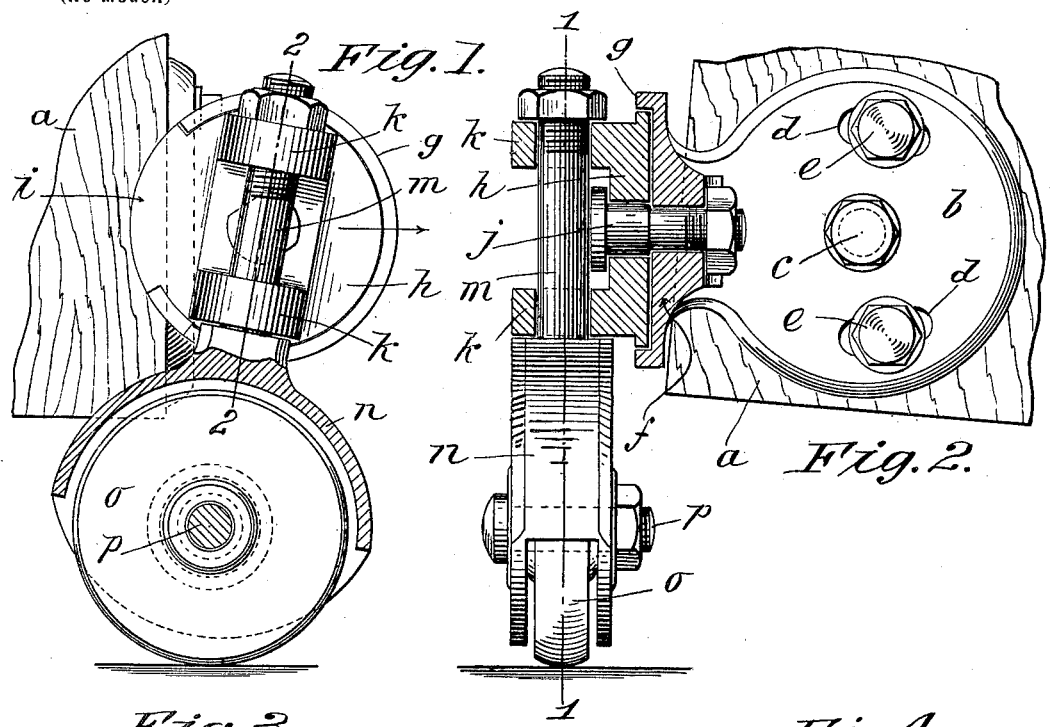
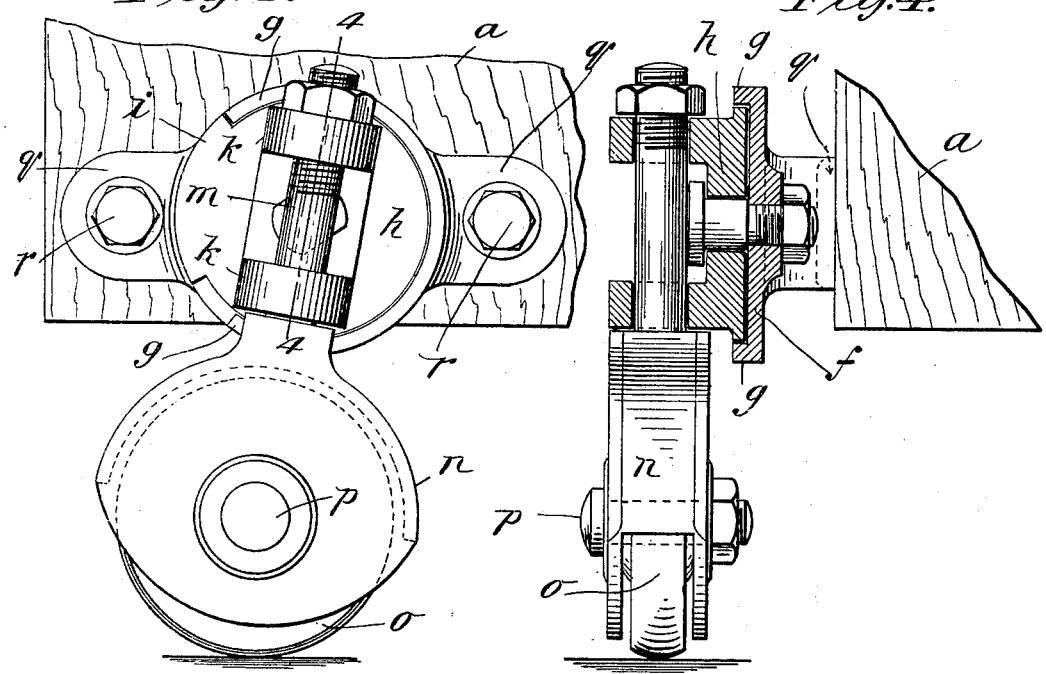
Witnesses:
J. D. Garfield
K. J. Clemons
Inventor:
William J. Sumner
by Chapin & Co.
Attorneys

UNITED STATES PATENT OFFICE.

WILLIAM J. SUMNER, OF HOLYOKE, MASSACHUSETTS, ASSIGNOR OF ONE-HALF TO AZRO A. COBURN, OF HOLYOKE, MASSACHUSETTS.

CASTER.

SPECIFICATION forming part of Letters Patent No. 706,209, dated August 5, 1902.

Application filed May 20, 1902. Serial No. 108,151. (No model.)

*To all whom it may concern:*

Be it known that I, WILLIAM J. SUMNER, a citizen of the United States of America, residing at Holyoke, in the county of Hampden and State of Massachusetts, have invented new and useful Improvements in Casters, of which the following is a specification.

This invention relates to casters and the like, and has particular reference to devices of this character for use on heavy articles, the object of the invention being to provide a caster or bearing wheel constructed in such manner that it will properly trail when the article to which it is attached is moved, the axis on which it may swivel in a vertical plane being inclined to the vertical to the end that when the article supported by the caster is moved in a plane at an angle to the plane of rotation of the caster-wheel the latter may swivel on its vertical axis, and thereby assume a proper trailing position in a new direction.

A further object of the invention is to provide the caster with a support, whereby if it is to be used, for example, on a store-service ladder, which is inclined against a line of shelves, the caster may be so secured that its bearing-wheel may always rotate in a vertical plane.

In the drawings forming part of this application, Figure 1 is a side elevation, partly in section, of a caster construction embodying my invention. Fig. 2 is a partly-sectional view taken on line 2 2, Fig. 1. Fig. 3 is a side elevation of a slightly-modified construction. Fig. 4 is an elevation, partly in section, on line 4 4, Fig. 3, of the construction shown in Fig. 3.

Referring to the drawings, $a$ indicates a portion of some article to which the caster may be applied—as, for example, some piece of furniture or store-service ladder. The caster is secured to this article generally by means of a plate $b$, provided with a central perforation therethrough to receive a bolt $c$, and with two slots $d$, concentric with said bolt, through which other bolts $e$ may pass. Located at right angles to this plate $b$ and preferably integral therewith is the circular plate $f$, having disposed around its border a flange $g$, a portion of which is broken away, as shown in Figs. 1 and 3. This flange lies at right angles to the plane of said plate $f$, and bearing on said plate and fitting closely within the borders of the flange, on the edge thereof, is the swivel-plate $h$, a portion of the border of which (indicated by $i$) lies bebetween the ends of the flange $g$. Said portion $i$ of the border of the swivel-plate $h$ is of such dimension that when the plate is swung on its axis it may move a predetermined distance before being brought to a stop by the contact of one end of said portion $i$ on the plate $h$ with one of the ends of the flange $g$, and the width of said portion $i$ is proportioned relative to the space between the ends of the flange $g$ so that the plate $h$ may be swung to an equal distance each side of a vertical line.

To hold the plate $h$ in its proper relations with the circular plate $f$, a bolt $j$ passes centrally therethrough and is secured by a nut rigidly to the plate $f$, between which and a head on said bolt the plate $h$ may turn freely, swinging on said bolt.

On the plate $h$ there are cast at right angles to the plane of its rotation two lugs $k$, and in these lugs there is mounted a rotatable post $m$, on the lower end of which is cast the wheel-casing $n$. The post may be supported in said lugs in a vertical position in any convenient manner.

As shown in the drawings, the top of the wheel-casing $n$ is squared off at right angles to the axis of the post to bear against the lower one of said lugs, and the upper end of the post, which passes through the upper lug, has a nut applied thereto, the adjustment of the latter being such that said casing may swivel freely on a vertical axis. In said casing there is a wheel $o$, supported on a bolt $p$, passing through the wall of said casing.

The sides of the wheel-casing $n$ are carried down, as shown in the drawings, to quite a distance below the axles of the wheel $o$, whereby the latter is almost entirely inclosed and the wheel thus protected.

From the foregoing it is plain that the vertical post on which the wheel $o$ swivels will if the article to which the caster is secured be moved from left to right assume the position shown in Fig. 1 and that if that article be moved in the reverse direction said post will assume a position inclined to the vertical in the opposite direction, the ends of the flange g determining the degree of the swing. This will bring the contact-point between the wheel and the floor out of line with the axis of the post, and therefore if the article to which the caster is attached be moved in a plane oblique to the plane of rotation of the wheel o the latter and the wheel-casing and post will be caused to turn on the axis of the post to permit the wheel o to assume a new position. It is therefore clear that in whichever direction the article supported by the casting may be moved the wheel o will be turned on its vertical axis, so that it will trail properly and will always be carried in a plane parallel with the line of movement of the article to which it is attached.

In Fig. 2 the caster is shown secured to the end of a ladder such as is used in stores for reaching high shelving, which ladder is inclined more or less toward the shelves, as shown by the drawings. It is obvious that though the latter may be inclined as shown, the post m cannot be so inclined without bringing an undue strain upon the axis of the wheel, and therefore means are provided whereby the vertical position of the post may always be maintained when the wheel is viewed edgewise. This is accomplished by the provision of the slots d in the plate b, whereby after the bolt c has been somewhat tightened up said plate may be rotated thereon until the post m lies in a vertical plane relative to the floor, regardless of the degree of inclination of that part of the article to which the plate b is attached. The bolts e may then be tightened up and the caster thereby firmly secured in position.

In Figs. 3 and 4 of the drawings a slight modification of the above-described construction is shown. This modification consists in doing away with the plate b in such cases where the character of the article to which the caster is attached would preclude the possibility of its ever being used in an inclined position, and two ears q are cast on opposite sides of the plate f and are perforated to receive bolts r, whereby the caster may be nonadjustably secured to the article. As shown in Fig. 4, it is necessary that these ears q be cast in a position offset from the plane of the plate f to provide a space back of said plate for the nut on the bolt j.

Having thus described my invention, what I claim, and desire to secure by Letters Patent of the United States, is—

1. A caster consisting of a base-plate adapted to be secured in a vertical plane to an article to be supported thereby; a swivel-plate pivotally supported on said base-plate, means for rotatably supporting a post vertically on said swivel-plate, a wheel suitably supported on the lower end of said post; and means whereby the swivel-plate may have a limited oscillatory movement on the base-plate, whereby said post may be swung to a position oblique to the perpendicular, in the plane of rotation of the wheel only.

2. A caster consisting of a plate adapted to be secured to an article to be supported thereby; a base-plate integral with said first-named plate located at right angles thereto and lying in a vertical plane; a swivel-plate pivotally supported on the base-plate; a post rotatably supported on the swivel-plate in a perpendicular position; a broken flange on the base-plate, and a projection on the swivel-plate lying between the ends of said flange, whereby the oscillations of the swivel-plate may be limited.

WILLIAM J. SUMNER.

Witnesses:
H. A. CHAPIN,
K. I. CLEMONS.